US011882207B2

(12) United States Patent
Ard et al.

(10) Patent No.: US 11,882,207 B2
(45) Date of Patent: *Jan. 23, 2024

(54) METHOD FOR SECURELY TRANSMITTING LIGHTING SCENES OVER A COMPUTER NETWORK WITH CLOUD SETUP AND AUTHENTICATION

(71) Applicant: LEVITON MANUFACTURING CO., INC., Melville, NY (US)

(72) Inventors: Aaron Ard, Ponchatoula, LA (US); Brian Yokum, New Orleans, LA (US); Frederick J. Hebert, Jr., Luling, LA (US); Ronald J. Gumina, Mandeville, LA (US); James Shurte, New Orleans, LA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,377

(22) Filed: Feb. 14, 2023

(65) Prior Publication Data
US 2023/0198742 A1 Jun. 22, 2023

Related U.S. Application Data

(62) Division of application No. 16/705,712, filed on Dec. 6, 2019, now Pat. No. 11,595,186.
(Continued)

(51) Int. Cl.
*H04L 9/06* (2006.01)
*H04W 4/06* (2009.01)
(Continued)

(52) U.S. Cl.
CPC ............ *H04L 9/0631* (2013.01); *H04W 4/06* (2013.01); *H04W 12/033* (2021.01);
(Continued)

(58) Field of Classification Search
CPC .... H04L 9/0631; H04L 67/10; H04W 12/033; H04W 12/041; H04W 4/06; H04W 84/12; H05B 47/155; H05B 47/19
(Continued)

(56) References Cited

U.S. PATENT DOCUMENTS 6,711,400 B1 * 3/2004 Aura .................... H04W 12/069
455/433
9,456,293 B2 * 9/2016 Ryhorchuk ............ H04L 67/12
(Continued)

FOREIGN PATENT DOCUMENTS

EP 3375160 A1 9/2018

*Primary Examiner* — Samson B Lemma
(74) *Attorney, Agent, or Firm* — KDW Firm PLLC

(57) ABSTRACT

Techniques for securely controlling multiple lighting devices simultaneously with a lighting control device are disclosed. Command messages may be transmitted from the lighting control device to multiple lighting devices over a computer network without routing through a remote cloud service. The messages may be encrypted and may include an incremented sequence number. Lighting devices that receive a command message may compare the incremented sequence number to a previously stored sequence number corresponding to the lighting control device. If the incremented sequence number is greater than the stored sequence number, then a lighting device may determine the message was transmitted by an authorized lighting control device and may implement any command instruction included therein. If the incremented sequence number is equal to or less than the stored sequence number, then the lighting device may determine the command message was transmitted by a malicious source and may ignore the command message.

25 Claims, 10 Drawing Sheets

Related U.S. Application Data

(60) Provisional application No. 62/779,022, filed on Dec. 13, 2018.

(51) Int. Cl.
  *H05B 47/155* (2020.01)
  *H05B 47/19* (2020.01)
  *H04W 12/033* (2021.01)
  *H04W 12/041* (2021.01)
  *H04L 67/10* (2022.01)
  *H04W 84/12* (2009.01)

(52) U.S. Cl.
  CPC ........ *H04W 12/041* (2021.01); *H05B 47/155* (2020.01); *H05B 47/19* (2020.01); *H04L 67/10* (2013.01); *H04W 84/12* (2013.01)

(58) Field of Classification Search
  USPC .......................................................... 713/171
  See application file for complete search history.

(56) References Cited

U.S. PATENT DOCUMENTS

| | | | |
|---|---|---|---|
| 10,405,404 B1* | 9/2019 | Trickler | H05B 47/105 |
| 10,681,659 B2* | 6/2020 | Yao | H04W 56/0015 |
| 2011/0243325 A1* | 10/2011 | Ishii | G09G 3/20 |
| | | | 345/589 |
| 2018/0014387 A1* | 1/2018 | Bard | H05B 47/115 |
| 2018/0116040 A1* | 4/2018 | Mann | H04L 67/12 |
| 2018/0332692 A1* | 11/2018 | Feil | H04W 12/02 |
| 2020/0015341 A1* | 1/2020 | Mann | H05B 47/11 |
| 2020/0045799 A1* | 2/2020 | Bard | H05B 47/115 |
| 2021/0160088 A1* | 5/2021 | Tang | H04W 12/065 |

\* cited by examiner

| Challenge Number 710 | Recipient Identifier/Address 708 | Sender Identifier/ Address 706 | Type 704 | Scope 702 |

| Challenge Number 710 | Sequence Number 802 | Recipient Identifier/Address 708 | Sender Identifier/Address 706 | Type 704 | Scope 702 |

| Instruction 908 | Sequence Number 906 | Recipient Identifier/Address 904 | Sender Identifier/Address 706 | Type 902 | Scope 702 |

METHOD FOR SECURELY TRANSMITTING LIGHTING SCENES OVER A COMPUTER NETWORK WITH CLOUD SETUP AND AUTHENTICATION

CROSS-REFERENCE TO RELATED APPLICATIONS

This application is a divisional application of pending U.S. patent application Ser. No. 16/705,712, filed Dec. 6, 2019, which is a non-provisional of and claims the benefit of priority under 35 U.S.C. § 119(e) from U.S. Provisional Application Ser. No. 62/779,022 filed Dec. 13, 2018, entitled "METHOD FOR SECURELY TRANSMITTING LIGHTING SCENES OVER A COMPUTER NETWORK WITH CLOUD SETUP AND AUTHENTICATION."

FIELD OF THE DISCLOSURE

The present disclosure relates generally to control of lighting devices and, more particularly, to secure control of lighting devices over a computer network.

BACKGROUND OF THE DISCLOSURE

Simultaneous control of multiple lighting loads is often desired by users of lighting systems. To ensure control commands are securely transmitted and received, control commands are often routed through a remote cloud service to verify the sender and the recipients of the issued control commands. Routing control commands through the remote cloud service can result in noticeable delays between issuance of a control command and implementation of the control command by the recipient lighting loads. As an alternative, a more direct secure communications tunnel can be established between a control device and the recipient lighting loads each time a control command is issued. However, establishing the secure communications tunnel is complex and time consuming, typically resulting in a perceptible delay between the responses of each recipient lighting load to the control command, which users often find unacceptable.

Thus, it would be desirable to provide simultaneous control of multiple lighting loads in a secure manner without a noticeable delay between issuing a control command and receiving the control command and without a perceptible offset between each lighting load in implementing the control command.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure provides techniques for securely and simultaneously controlling multiple lighting devices with a lighting control device. In one example embodiment, command messages may be transmitted from the lighting control device to multiple lighting devices over a local computer network without routing the command messages through a remote computer network or cloud service. The command messages may be encrypted and may include an incremented sequence number. Lighting devices that receive a command message may compare the incremented sequence number to a previously stored sequence number corresponding to the lighting control device. If the incremented sequence number is greater than the stored sequence number, then a lighting device may determine the command message was transmitted by an authorized lighting control device. The lighting device may then further process the command message and implement any command instruction included therein. Alternatively, if the incremented sequence number is not greater than the stored sequence number, then the lighting device may determine the command message was transmitted by a malicious source and may ignore the command message. In this way, vulnerability to a recorded and replayed command message from the malicious source is mitigated while enabling command messages to be sent more directly to recipient lighting devices, thereby ensuring simultaneous control as perceived by a user.

In one embodiment, disclosed herein is a lighting control device including a memory component and logic, at least a portion of the logic implemented in circuitry coupled to the memory component, the logic to generate a sequence number and store the sequence number in the memory component, cause the lighting control device to receive a synchronization request message from a lighting device over a wireless local area network (LAN), determine a challenge number included in the synchronization request message, generate a synchronization response message, the synchronization response message to include the challenge number and the sequence number, and cause the lighting control device to transmit the synchronization response message to the lighting device over the wireless LAN.

In one embodiment, disclosed herein is a method including generating a sequence number, storing the sequence number in a memory component, causing the lighting control device to receive a synchronization request message from a lighting device over a wireless local area network (LAN), determining a challenge number included in the synchronization request message, generating a synchronization response message, the synchronization response message to include the challenge number and the sequence number, and causing the lighting control device to transmit the synchronization response message to the lighting device over the wireless LAN.

In one embodiment, disclosed herein is a lighting control device including a user interaction component, a memory component, and logic, at least a portion of the logic implemented in circuitry coupled to the memory component and the user interaction component, the logic to process a setup message assigning a first lighting device and a second lighting device and a corresponding lighting action to the user interaction component, receive an input from a user through the user interaction component, retrieve a sequence number stored in the memory component, increment the sequence number to generate an incremented sequence number, generate a command message in response to the received input from the user, the command message to include a command instruction corresponding to the lighting action, the command message to further include the incremented sequence number, and cause transmission of the command message to the first and second lighting devices over a wireless local area network (LAN).

In one embodiment, disclosed herein is a method including processing a setup message assigning a first lighting device and a second lighting device and a corresponding lighting action to a user interaction component, receiving an input from a user through the user interaction component, retrieving a sequence number stored in a memory component, incrementing the sequence number to generate an incremented sequence number, generating a command message in response to the received input from the user, the command message to include a command instruction corresponding to the lighting action, the command message to further include the incremented sequence number, and causing the command message to transmit to the first and second lighting devices over a wireless local area network (LAN).

In one embodiment, disclosed herein is a lighting device including a memory component and logic, at least a portion of the logic implemented in circuitry coupled to the memory component, the logic to, generate a first challenge number, generate a synchronization request message, the synchronization request message to include the first challenge number, cause transmission of the synchronization request message to a lighting control device over a wireless local area network (LAN), process a synchronization response message received over the wireless LAN from the lighting control device, determine a second challenge number and a sequence number included in the synchronization response message, compare the first and second challenge numbers, and store the sequence number in the memory component when the first challenge number matches the second challenge number.

In one embodiment, disclosed herein is a method including generating a first challenge number, generating a synchronization request message, the synchronization request message to include the first challenge number, causing transmission of the synchronization request message to a lighting control device over a wireless local area network (LAN), processing a synchronization response message received over the wireless LAN from the lighting control device, determining a second challenge number and a sequence number included in the synchronization response message, comparing the first and second challenge numbers, and storing the sequence number in the memory component when the first challenge number matches the second challenge number.

In one embodiment, disclosed herein is a lighting device including a lighting load, a memory component, and logic, at least a portion of the logic implemented in circuitry coupled to the memory component and the lighting load, the logic to process a command message from a lighting control device received over a wireless local area network (LAN), determine a first sequence number included in the command message, retrieve a second sequence number from the memory component, compare the first and second sequence numbers, and determine a command instruction included in the command message and control the lighting load based on the command instruction when the first sequence number is greater than the second sequence number.

In one embodiment, disclosed herein is a method including processing a command message from a lighting control device received over a wireless local area network (LAN), determining a first sequence number included in the command message, retrieving a second sequence number from a memory component, comparing the first and second sequence numbers, and determining a command instruction included in the command message and controlling a lighting load based on the command instruction when the first sequence number is greater than the second sequence number.

BRIEF DESCRIPTION OF THE DRAWINGS

By way of example, specific embodiments of the disclosed device will now be described, with reference to the accompanying drawings, in which:

FIG. 7 illustrates an example synchronization request message generated and transmitted by the lighting device of FIG. 1 according to an example embodiment;

FIG. 8 illustrates an example synchronization response message generated and transmitted by the lighting control device of FIG. 1 according to an example embodiment;

FIG. 9 illustrates an example command message generated and transmitted by the lighting control device of FIG. 1 according to an example embodiment.

DETAILED DESCRIPTION

Figure 1:
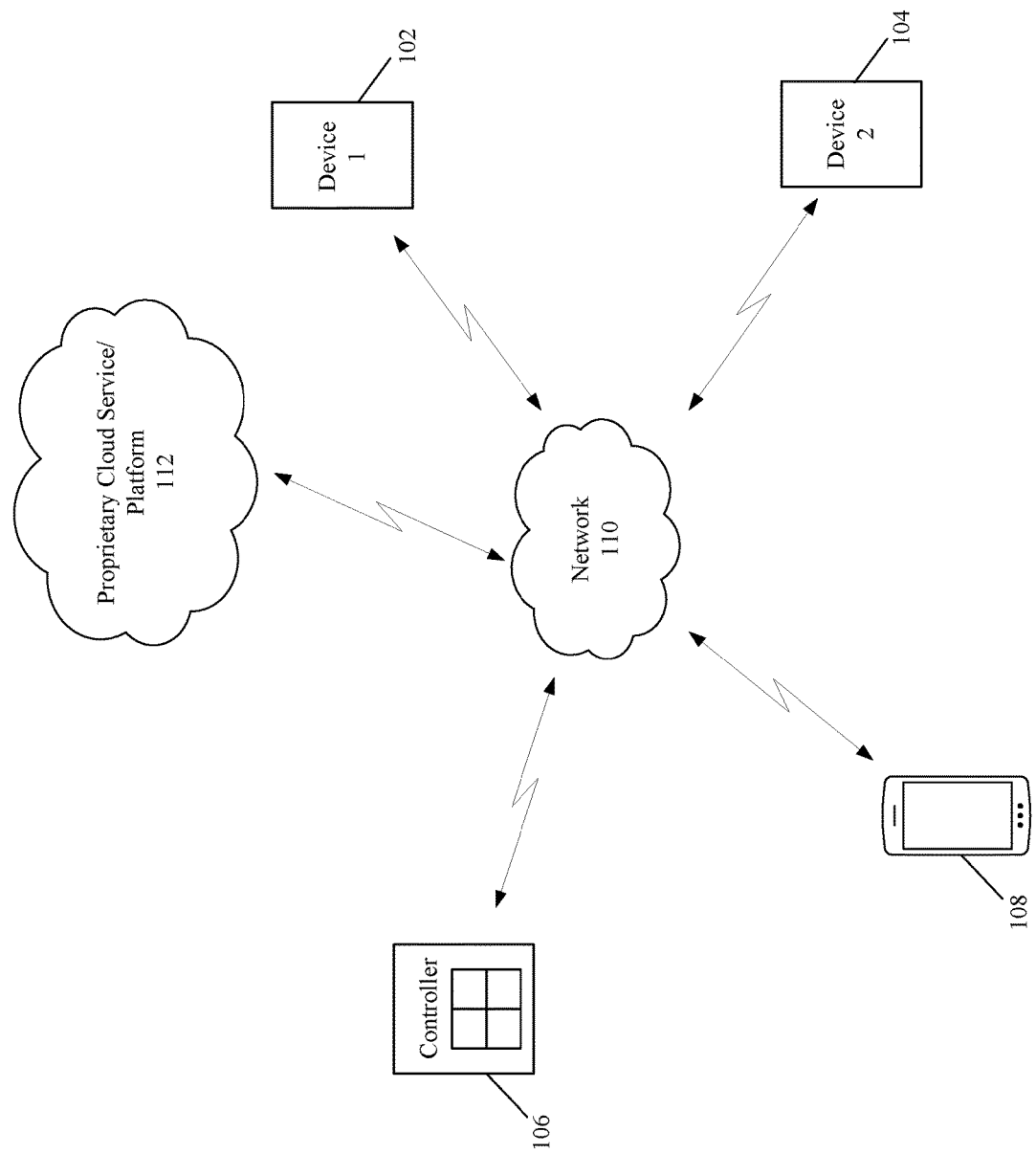
FIG. 1 illustrates an example embodiment of an operating environment for securely transmitting lighting commands (e.g., for lighting scenes) over a computer network in accordance with one aspect of the present disclosure.

A device, system, and method in accordance with the present disclosure will now be described more fully hereinafter with reference to the accompanying drawings, in which preferred embodiments of the device, system, and method are shown. The disclosed device, system, and method, however, may be embodied in many different forms and should not be construed as being limited to the embodiments set forth herein. Rather, these embodiments are provided so that this disclosure will be thorough and complete, and will fully convey the scope of the devices, system and method to those skilled in the art. In the drawings, like numbers refer to like elements throughout.

FIG. 1 illustrates an example operating environment 100 for securely transmitting lighting commands such as, for example, lighting scenes, or the like, over a network. The operating environment 100 may include a first lighting device 102, a second lighting device 104, a lighting control device 106, and a user device 108. The operating environment 100 may further include a network 110. The first lighting device 102, the second lighting device 104, the lighting control device 106, the user device 108, and the network 110 may be provided within the same physical space such as, for example, a home, an office, a retail space, a warehouse, etc. Alternatively, the first lighting device 102, the second lighting device 104, the lighting control device 106, the user device 108, and the network 110 may be located in separate spaces. As disclosed herein, the lighting control device 106 may be used to control the first and second lighting devices 102 and 104 in a secure manner over the network 110 to provide, for example, a desired lighting scene.

The first and second lighting devices 102 and 104 may be any lighting device including, for example, an LED light or lighting system, a fluorescent lighting system, a smart lighting device, a Wi-Fi-enabled lighting device, a Wi-Fi plug-in coupled lighting device, etc. The first and second lighting devices 102 and 104 may be identical devices or, alternatively, may be different types of devices. The lighting control device 106 may interact with the first and second lighting devices 102 and 104 over the network 110 to control operation of the first and second lighting devices 102 and 104. The operating environment 100 is not limited to the first and second lighting devices 102 and 104. In general, the operating environment 100 may include any number of lighting devices that may be controlled by the lighting control device 106. Further, the operating environment 100 is not limited to the lighting control device 106. In general, the operating environment 100 may include any number of lighting control devices that may control any number and combination of lighting devices that may be provided within the operating environment 100.

The lighting control device 106 may be any suitable lighting control device now known or hereafter developed including, for example, an in-wall lighting control device, a fixed wall-station lighting control device, a portable handheld lighting control device, etc. The lighting control device 106 may include one or more user interaction features or user interaction components such as, for example, a keypad with multiple push buttons. The lighting control device 106 may be used to simultaneously control multiple lighting devices, such as the first and second lighting devices 102 and 104. As part of a setup or commissioning process, each user input feature of the lighting control device 106 may be assigned to control one or more lighting devices in a specific manner. For example, when a first user interaction feature of the lighting control device 106 is activated, pressed, engaged, or the like (used interchangeably herein without the intent to limit) by a user, the first and second lighting devices 102 and 104 may be turned ON. When a second user interaction feature of the lighting control device 106 is activated by the user, the first and second lighting devices 102 and 104 may be dimmed DOWN. In this way, the lighting control device 106 may provide, for example, control of lighting scenes established by the user in an accessible and user-friendly manner—for example, by simply pressing a button on the lighting control device 106.

The user device 108 may be any suitable user device now known or hereafter developed including, for example, an electronic device and/or a computing device such as, for example, a smartphone, a tablet, a laptop, a notebook, a netbook, a personal computer (PC), etc. The user device 102 may be used to setup or commission the first and second lighting devices 102 and 104 and/or the lighting control device 106. For example, the user device 108 may be used to assign the first and second lighting devices 102 and 104 to a first user interaction feature of the lighting control device 106. Further, the user device 108 may be used to assign an action or operation to the first user interaction feature of the lighting control device 106 such as, for example, an action to turn ON the first and second lighting devices 102 and 104 when the first user interaction feature is activated by the user. This allows the user to simultaneously control the first and second lighting device 102 and 104 to provide, for example, a desired lighting scene by pressing the first user interaction feature of the lighting control device 106.

The network 110 may be any suitable computer network now known or hereafter developed including, for example, any wired and/or wireless local area network (LAN) operating according to any now known or hereafter developed wired and/or wireless communication standard or protocol. For example, the network 110 may be a Wi-Fi wireless LAN operating according to any IEEE 802.11 standard or protocol. The network 110 enables communication between each of the components depicted in the operating environment 100. For example, command messages issued by the lighting control device 106 may be transmitted over the network 110 for receipt by the first lighting device 102 and/or the second lighting device 104. Each component of the operating environment 100 may communicate with any other component of the operating environment 100 through the network 110. In one embodiment, the network 110 may be a wireless network provided by operation of a router or an access point that may route communications between any components of the operating environment 100.

As shown in FIG. 1, the network 110 may provide connectivity between any component of the operating environment 100 and a proprietary cloud service and/or platform 112. The proprietary cloud service and/or platform 112 may be any proprietary cloud service and/or platform associated or affiliated with the lighting control device 106 such as, for example, a company's proprietary cloud service (herein referred to as the "Proprietary" cloud or platform 112). The network 110 may also provide connectivity between any component of the operating environment 100 and any third-party cloud service or platform or the Internet (not depicted in FIG. 1 for simplicity).

The user device 108 may use connectivity to the Proprietary cloud 108 to setup and/or configure operation of the lighting control device 106 and/or the first and second lighting devices 102 and 104 including, for example, connecting the lighting control device 106 and/or the first and second lighting devices 102 and 104 to the network 110. After configuring operation of the lighting control device 106 and/or the first and second lighting devices 102 and 104, the user may interact with the lighting control device 106 to simultaneously control the first and second lighting devices 102 and 104 to provide, for example, a desired lighting scene. In contrast to know lighting systems and/or lighting control systems, the lighting control device 106 may transmit command messages to the first and second lighting devices 102 and 104 directly through the network 110 without routing the commands through the Proprietary cloud 112. As a result, the first and second lighting devices 102 and 104 react more quickly to received commands so as to appear to respond simultaneously to provide, for example, the desired lighting scene.

After the lighting control device 106 is installed, the lighting control device 106 may be enrolled to the Proprietary cloud 112 as a controller located and operating within the operating environment 100. In one embodiment, the lighting control device 106 may be linked to the Proprietary cloud 112 and associated with the operating environment 100 by the user directly interacting with the lighting control device 106. In another embodiment, the user may use the user device 108 to enroll the lighting control device 106 with the Proprietary cloud 112 and associate the lighting control device 106 to the operating environment 100. The user device 108 may include an application (app) or other program that allows the user to link the lighting control device 106 to the Proprietary cloud 112 and/or to associate the lighting control device 106 to the specific operating environment 100—for example, to the particular office space, house, etc. that the components in the operating environment 100 occupy. As part of enrolling the lighting control device 106, the user may specify that the lighting control device 106 will be located within the operating environment 100 and will be used to control one or more of the first and second lighting devices 102 and 104.

After the lighting control device 106 is enrolled with the Proprietary cloud 112 and/or associated with the operating environment 100, the Proprietary cloud 112 may generate an encryption key. The encryption key may be a 128-bit Advanced Encryption Standard (AES) key but is not so limited as any known encryption technology and corresponding encryption key may be used. The 128-bit AES key may be randomly generated. The 128-bit AES key may be assigned to the operating environment 100 and may be referred to as the "residence key" or "residence encryption key" for the operating environment 100 (or the office space, home, etc. represented by the operating environment 100).

If the operating environment 100 already includes a lighting control device such that the lighting control device 106 is not the first lighting control device associated with the operating environment 100, then a residence key may have been previously generated. Under such a scenario, the previously generated residence key will be stored by the Proprietary cloud 112 and transmitted to the lighting control device 106 after enrolling with the Proprietary cloud 112.

The user may use the user device 108 to assign actions or functions to each user interaction feature (e.g., button) provided on the lighting control device 106. The assigned actions may be transmitted to and stored by the Proprietary cloud 112. As mentioned, the user device 108 may include an app or other program that allows the user to interact with the Proprietary cloud 112. The app or program may allow the user to specify, and the Proprietary cloud 112 to store, which of the first and second lighting device 102 and 104 are to be controlled by a specific user interaction feature of the lighting control device 106. The app or program may further allow the user to specify, and the Proprietary cloud 112 to store, a specified action such as, for example, turning ON/OFF or dimming UP/DOWN one or more of the first and second lighting devices 102 and 104. The Proprietary cloud 112 may then transmit the specified user interaction features and associated lighting actions to the lighting control device 106 as a setup message. The lighting control device 106 may process the setup message by storing this information to guide operation of the lighting control device 106.

The Proprietary cloud 112 may also transmit a message to each of the first and second lighting devices 102 and 104. The transmitted message may indicate a number of lighting control devices that may be assigned to control a particular lighting device. In one embodiment, the transmitted message may specify the specific controller device (e.g., the lighting control device 106) that the user has assigned to control the lighting device. The message may also indicate that the first and second lighting device 102 and 104 are to enable receipt of multicast or broadcast messages from controller devices (e.g., the lighting control device 106) or any other component operating within the operating environment 100 that is enrolled with the Proprietary cloud 112.

Each component of the operating environment 100 may receive and store the residence key from the Proprietary cloud 112 when the component is linked to the Proprietary cloud 112 and/or when the component is connected to the network 110. The residence key may be used by each component to encrypt messages or other communications between any of the components of the operating environment 100 depicted in FIG. 1.

The lighting control device 106 may send command messages to each of the first and second lighting devices 102 individually or collectively. In general, the lighting control device 106 may generate and transmit a command message intended to be receive and processed by a single lighting device, a group of lighting devices, or by all lighting devices operating within the operating environment 100.

To securely issue commands to the first and second lighting devices 102 and 104, each command message generated by the lighting control device 106 may include a sequence number and a command instruction. The sequence number and command instruction may be encrypted using the residence key. The sequence number may be a random number generated by the lighting control device 106 after the lighting control device 106 is linked to the Proprietary cloud 112 and associated with the operating environment 100. The sequence number may be stored by the Proprietary cloud 112 and/or in non-volatile memory of the lighting control device 106. The command instruction may correspond to a lighting action assigned to a particular user input/interaction feature or user input/interaction component of the lighting control device 106. The command instruction may instruct a lighting device to adjust an operational state of a lighting load that is part of or coupled to the lighting device in accordance with the lighting action previously specified by the user.

The sequence number may be incremented by the lighting control device 106 each time a new command message is generated such that the incremented sequence number is included in the command message. A component of the operating environment 100 that receives a command message from the lighting control device 106—such as, for example, the first lighting device 102—may process the command message by decrypting the command message to determine the included sequence number. The first lighting device 102 may then compare the received sequence number to the last sequence number received from the lighting control device 106. The first lighting device 102 may accept the command instruction included in the command message only if the sequence number included in the command message is greater than the last sequence number received from the lighting control device 106. If the sequence number included in the command message is equal to or less than the last sequence number received from the lighting control device 106, then the first lighting device 102 may be configured to ignore the included command instruction.

By including an incremented sequence number in each command message, control of the lighting devices 102 and 104 is protected against an attack, such as, for example, a replay attack. A replay attack may occur when a control message is recorded and replayed by an unauthorized user or device. Even if the control message is encrypted, the encrypted control message may be recorded and replayed to control the first and second lighting devices 102 and 104. Therefore, to avoid transmitting identical command messages, the sequence number may be changed for each command message that is issued and may be different from the last sequence number provided in any prior command message. Accordingly, if a command message is recorded and replayed and includes a sequence number that was previously used, then the first lighting device 102 and/or the second lighting device 104 that receives the replayed command message may determine the command message is invalid because it fails to include an incremented sequence number. That is, the sequence number in the replayed command message would be equal to or less than the last sequence number received from the lighting control device 106. The first lighting device 102 and/or the second lighting device 104 may then flag the replayed command message as received from an unauthorized source and may ignore any instruction included in the command message. Inclusion of the sequence number in each command message also enables encrypted messages from the lighting control device 106 to be issued and received without the need to provide lighting control instructions through the Proprietary cloud 112. Additionally, inclusion of the sequence number in a command message and/or the possible encryption of the command message allows a device that receives the command message (e.g., the first lighting device 102 and/or the second lighting device 104) to authenticate the validity of the command message and/or the sender of the command message (e.g., the lighting control device 106).

In one embodiment, the sequence number may be incremented by a fixed amount. For example, the sequence number may be incremented each time by a value of 1 (one). Alternatively, the sequence number may be incremented by a random amount. In one embodiment, the random amount may be an integer. In one embodiment, the sequence number may be an integer including an initial or first generated sequence number. In general, the sequence number can be any value or type of number and/or can be a string.

To synchronize operation between the lighting control device 106 and any other controllable component within the operating environment 100—for example, the first lighting device 102—an initial sequence number may be shared between the lighting control device 106 and the first lighting device 102. To do so, the first lighting device 102 may process a synchronization request message. Processing the synchronization request message may involve encrypting the synchronization request message and causing the transmission of the synchronization request message via, e.g., a wireless communications interface or a wired communications interface. The synchronization request message may be encrypted using the residence key. The synchronization request message may be transmitted to a specific controller, to a group of controllers and/or devices, or to all controllers and devices within the operating environment 100.

In one embodiment, when the first lighting device 102 is linked to the Proprietary cloud 112 and/or joins the network 110, the first lighting device 102 may join a predetermined multicast group of devices. The predetermined multicast group of devices may include all components of the operating environment 100 or a subset thereof. After joining the predetermined multicast group, the first lighting device 102 may generate the synchronization request message. The synchronization request message may include a number referred to as a challenge number. The challenge number may be a randomly generated number. The synchronization request message may be encrypted prior to transmission to the predetermined multicast group of devices. In the illustrated example embodiment of FIG. 1, the encrypted synchronization request message may be transmitted and received by the lighting control device 106 and the second lighting control device 104.

In response to receiving the encrypted synchronization request message, the lighting control device 106 may process the encrypted synchronization message. Processing the encrypted synchronization message may involve decrypting the message and may involve determining that the synchronization request message was transmitted to the predetermined multicast group and therefore intended to be received and acted upon by the lighting control device 106. The lighting control device 106 may then generate a synchronization response message. The synchronization response message may include the challenge number and the initial sequence number of the lighting control device 106. The synchronization response message may then be encrypted and transmitted to the first lighting device 102.

Upon receipt of the synchronization response message, the first lighting device 102 may compare the challenge number included in the synchronization response message to the challenge number included in the synchronization request message. If the two challenge numbers match (e.g., are of equal value), then the synchronization response message may be considered to be authentic—i.e., verified as being received from the lighting control device 106 as an authentic device operating within the operating environment 100. The first lighting device 102 may then store the initial sequence number of the lighting control device 106 provided in the synchronization response message. The initial sequence number may be stored with a corresponding unique identifier or address for the lighting control device 106. Once the first lighting device 102 has stored the unique identifier for the lighting control device 106 and the initial sequence number for the lighting control device 106, then the first lighting device 102 and the lighting control device 106 may be synchronized. A subsequent command message received by the lighting device 102 by the lighting control device 106 may be confirmed as authentic if the command message includes a new sequence number that has a value greater than the initial sequence number. Each new sequence number received by the lighting device 102 from the lighting control device 106 may be stored for future comparisons.

Figure 2:
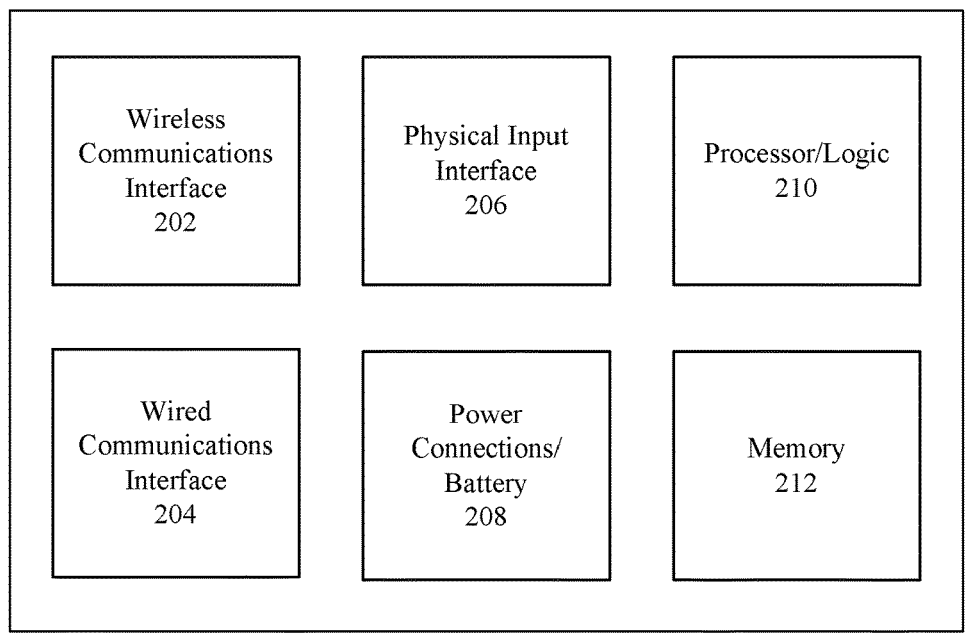
FIG. 2 illustrates a block diagram of an example embodiment of a lighting control device used in FIG. 1.

FIG. 2 illustrates an example embodiment of the lighting control device 106.

Specifically, FIG. 2 provides a block diagram of example functional components of the lighting control device 106. As shown, the lighting control device 106 may include a wireless communications interface 202. The wireless communications interface 202 may enable the lighting control device 106 to transmit and receive communications over the network 110 through any wireless communication technology. The lighting control device 106 may also include a wired communications interface 204. The wired communications interface 204 may enable the lighting control device 106 to transmit and receive communications over the network 110 through any wired communication technology. For example, the lighting control device 106 may process a communication or message for transmission by generating, encoding, and/or encrypting the communication or message, or portions thereof, and cause the communication or message to be transmitted by the wireless communications interface 202 and/or the wired communications interface 204. Similarly, the wireless communications interface 202 and/or the wired communications interface 204 may receive a communication or message for the lighting control device 106 and the lighting control device 106 may process the communication or message by decoding, decrypting, parsing, and/or interpreting the communication or message, or portions thereof.

The lighting control device 106 may include a physical input interface 206 for interfacing with one or more physical inputs that may be manipulated by the user. The physical input interface 206 may include or may be coupled to a variety of user input features including, for example, a keypad, push buttons, or slides. The physical input interface 206 may provide a way for the user to select, for example, a lighting scene that may be implemented by the lighting control device 106 issuing command messages to the first and second lighting devices 102 and 104 in response to a received input from the user (e.g., pressing a particular button of a keypad).

The lighting control device 106 may include a power source 208. The power source 208 may include electrical power connections and/or a battery. The power source 208 may provide power to any of the constituent functional components of the lighting control device 106 depicted in FIG. 2. The power source 208 may be coupled to the power supply of the physical space in which the lighting control device 106 operates and may provide battery backup during power failures or outages.

The lighting control device 102 may further include a processor circuit or circuitry 210 and an associated memory component 212. The memory component 212 may store one or more programs for execution by the processor circuit 210 to implement one or more functions or features of the lighting control device 106 as described herein. The processor circuit 210 may be implemented using any processor or logic device including, for example, any programmable logic device (PLD), application specific integrated circuit (ASIC), general purpose processor, or logic circuitry that is coupled to the memory component 212. The memory component 212 may be implemented using any machine-readable or computer-readable media capable of storing data, including both volatile and non-volatile memory, and may reside internal or external to the lighting control device 106.

The processor circuit 210 may implement the functionalities of any of the components depicted in FIG. 2 or may control or adjust operation of any of the depicted components. Each component depicted in FIG. 2 may be coupled to the processor circuit 210 as well as any other depicted component. The depicted components may be implemented in hardware or software as appropriate, or any combination thereof.

The processor circuit 210 may generate messages for transmission over the network 110 using the wireless communications interface 202 or the wired communications interface 204 depending on the type of medium used by the network 110. The processor circuit 210 may generate command messages for transmission to instruct the lighting device 102 and/or the lighting device 104 to operate in a specific manner. Further, the processor circuit 210 may generate messages to synchronize operation between the lighting control device 106 and the lighting device 102 and/or the lighting device 104. For example, the processor circuit 210 may generate the synchronization response message as described herein.

The processor circuit 210 may process messages received over the network 110 using the wireless communications interface 202 or the wired communications interface 204 depending on the type of medium used by the network 110. The processor circuit 210 may process messages received from any component of the operating environment 100. For example, the processor circuit may process a synchronization request messages received from a lighting device (e.g., the first lighting device 102) to determine a challenge number included in the synchronization request message.

The memory component 212 may store the initial sequence number for the lighting control device 106 and any incremented or new sequence number generated by the lighting control device 106. The memory component 212 may store any other information or data related to operation of the lighting control device 106 including, for example, any configuration data for establishing operation of the lighting control device 106.

In one embodiment, the lighting control device 106 may include further components and associated functionalities not shown in FIG. 2 including, for example, a voice control interface that may be used by the user to control the lighting control device 106, one or more microphones to receive audible commands from the user, one or more speakers to output audio information to the user, and a display and display controller to render visual information. The display may include a touchscreen or a touch-sensitive display. Accordingly, the display may provide visual information to the user and/or may receive input from the user.

Figure 3:
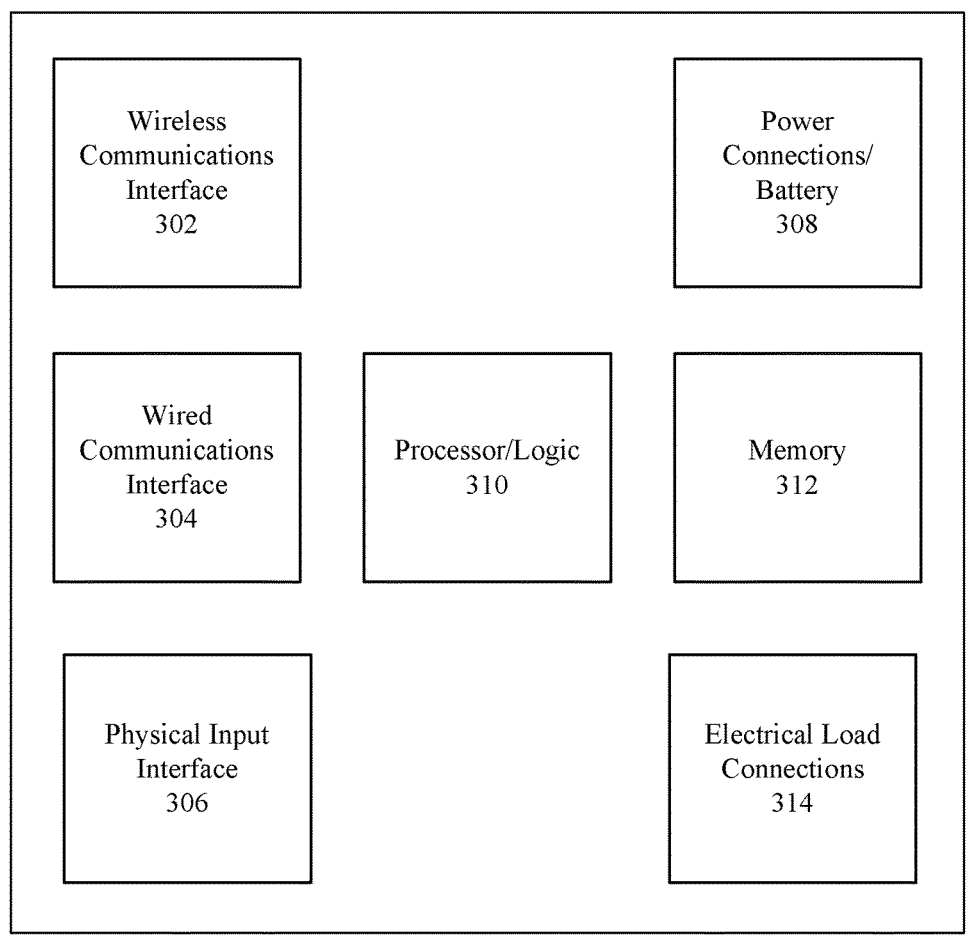
FIG. 3 illustrates a block diagram of an example embodiment of a lighting device used in FIG. 1.

FIG. 3 illustrates an example embodiment of the lighting device 102 (or, alternatively, the lighting device 104). Specifically, FIG. 3 provides a block diagram of example functional components of the lighting device 102. As shown, the lighting device 102 may include a wireless communications interface 302. The wireless communications interface 302 may enable the lighting device 102 to transmit and receive communications over the network 110 through any wireless communication technology. The lighting device 106 may also include a wired communications interface 304. The wired communications interface 304 may enable the lighting device 102 to transmit and receive communications over the network 110 through any wired communication technology.

The lighting device 102 may include a physical input interface 306 for interfacing with one or more physical inputs that may be manipulated by the user. The physical input interface 306 may include or may be coupled to a variety of user input features including one or more push buttons or switches and a dimmer switch or slide switch. The physical input interface 306 may provide a way for the user to locally control a lighting load of the lighting device 102.

The lighting device 102 may include a power source 308. The power source 308 may include electrical power connections and/or a battery. The power source 308 may provide power to any of the constituent functional components of the lighting device 102 depicted in FIG. 3. The power source 308 may be coupled to the power supply of the physical space in which the lighting device 102 operates and may provide battery backup during power failures or outages.

The lighting control device 102 may include an electrical load connection 314 providing electrical connectivity to a load of the lighting device 102. The load of the lighting device 102 may include any type of load such as, for example, incandescent, LED, CFL, EVL, Resistive, Halogen, Fluorescent, Inductive, etc.

The lighting device 102 may further include a processor circuit or circuitry 310 and an associated memory component 312. The memory component 312 may store one or more programs for execution by the processor circuit 310 to implement one or more functions or features of the lighting device 102 as described herein. The processor circuit 310 may be implemented using any processor or logic device including, for example, any programmable logic device (PLD), application specific integrated circuit (ASIC), general purpose processor, or logic circuitry that is coupled to the memory component 312. The memory component 312 may be implemented using any machine-readable or computer-readable media capable of storing data, including both volatile and non-volatile memory, and may reside internal or external to the lighting device 102.

The processor circuit 310 may implement the functionalities of any of the components depicted in FIG. 3 or may control or adjust operation of any of the depicted components. Each component depicted in FIG. 3 may be coupled to the processor circuit 310 as well as any other depicted component. The depicted components may be implemented in hardware or software as appropriate, or any combination thereof.

The processor circuit 310 may generate messages for transmission over the network 110 using the wireless communications interface 202 or the wired communications interface 204 depending on the type of medium used by the network 110. The processor circuit 310 may generate messages to synchronize operation with the lighting control device 106. For example, the processor circuit 310 may generate the synchronization request message as described herein.

The processor circuit 310 may process messages received over the network 110 using the wireless communications interface 202 or the wired communications interface 204 depending on the type of medium used by the network 110. The processor circuit 210 may process messages received from any component of the operating environment 100. For example, the processor circuit 310 may process a command message received from the lighting control device 106 to determine a sequence number included in the command message. The processor circuit 310 may compare the received sequence number to a sequence number stored in the memory component 312 to determine if the sequence number included in the received command message is greater than the stored sequence number. If so, then the processor circuit 310 may determine that the command instruction included in the message command is an authorized message to be further processed and executed.

As a further example, the processor circuit 310 may process a synchronization response message received from the lighting control device 106 to determine a challenge number included in the synchronization response message. The processor circuit 310 may compare the received challenge number to a challenge number stored in the memory component 312 to determine if the challenge numbers match. If so, then the processor circuit 310 may determine that the lighting control device 106 is an authorized device. The processor circuit 310 may then extract and store the sequence number of the lighting control device 106 provided in the synchronization response message. The received sequence number may be stored in the memory component 312. The processor circuit 310 may generate the challenge number included in the synchronization request message.

The memory component 312 may store the initial sequence number for the lighting control device 106 and any incremented or new sequence number received in a message from the lighting control device. The memory component 312 may store any other information or data related to operation of the lighting device 102 including, for example, any configuration data for establishing operation of the lighting device 102.

Figure 4:
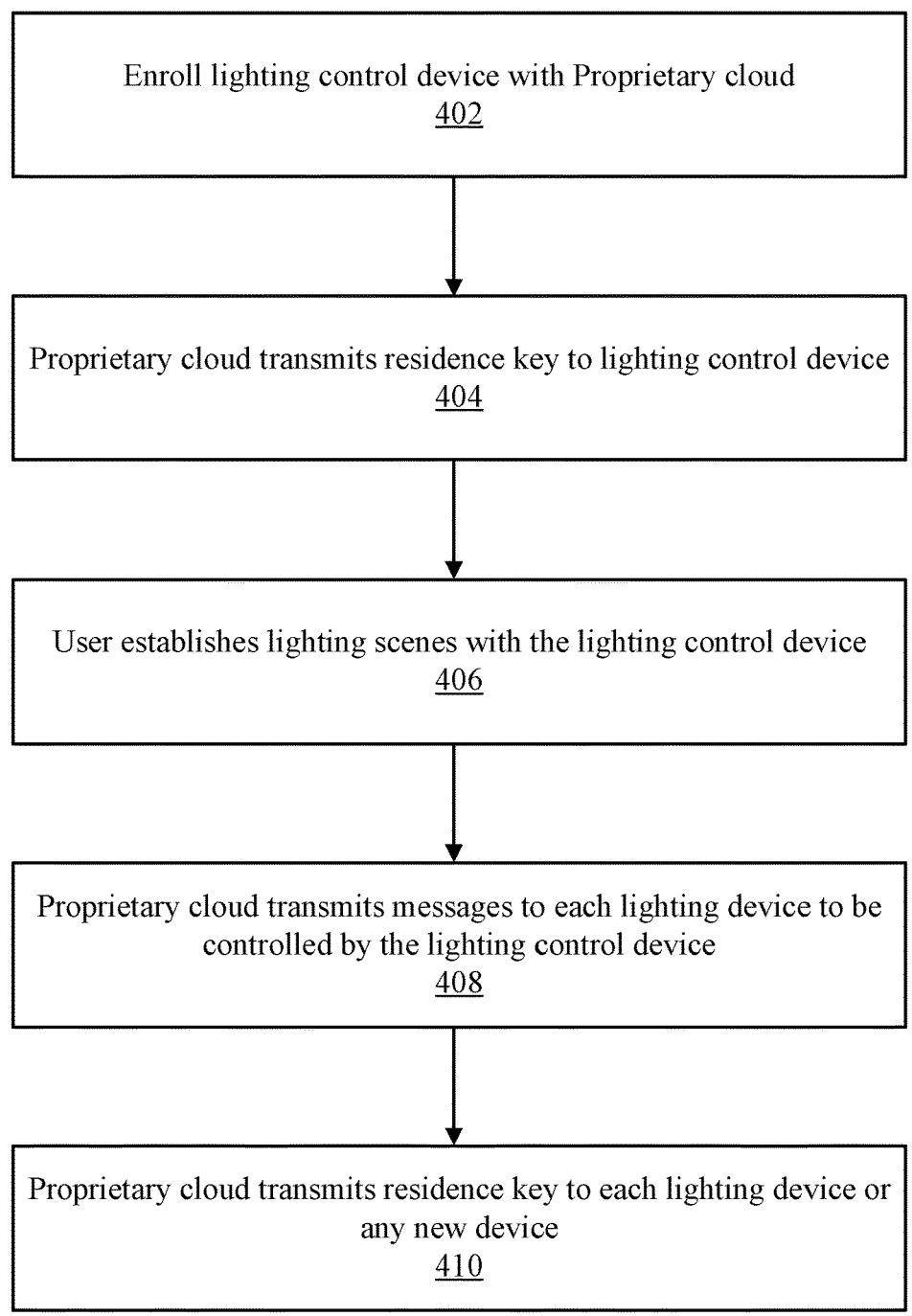
FIG. 4 illustrates a first logic flow associated with the lighting control device and the lighting devices of FIG. 1 according to one example embodiment.

FIG. 4 illustrates an example embodiment of a logic flow 400 that may be representative of techniques for configuring one or more components of an operating environment to facilitate secure transmission of, for example, lighting scenes over a network. For example, the logic flow 400 may be representative of operations that may be performed by one or more constituent components of the operating environment 100 depicted in FIG. 1.

At block 402, the lighting control device 106 enrolls with the Proprietary cloud 112. A user may enroll the lighting device 106 with the Proprietary cloud 112 by directly interacting with the lighting control device 106 or by indirectly interacting with the lighting device 106 through, for example, the user device 108. Enrollment of the lighting control device 106 may include identifying the lighting control device 106 as a controller that is to operate within the operating environment 100. Enrollment of the lighting device 106 may also include connecting the lighting control device 106 to the network 110.

At block 404, the Proprietary cloud 112 may transmit the residence key to the lighting control device 106. The residence key may be assigned to the operating environment 100.

At block 406, the user may establish desired lighting scenes with the lighting control device 106. Specifically, the user may assign one or more lighting devices—such as, for example, the first lighting device 102 and/or the second lighting device 104—to a user input feature of the lighting control device 106. For purposes of explanation, the first and second lighting devices 102 and 104 may be assigned to a first push button of the lighting control device 106. Further, the user may assign an action to the corresponding user input feature of the lighting control device 106. For purposes of explanation, the user may specify that activating the first push button of the lighting control device causes both the first and second lighting devices 102 and 104 to turn ON.

The user may assign lighting devices and corresponding actions to each user input feature of the lighting control device 106. The user may make these assignments by directly interacting with the lighting control device 106 or by indirectly interacting with the lighting device 106 through the user device 108. In one embodiment, the user may use an app or other program of the user device 108 to interact with the Proprietary cloud 112 to assign lighting devices and corresponding control actions to each user input feature provided by the lighting control device 106. The Proprietary cloud 112 may then transmit to the lighting control device 106 a listing of assigned lighting devices and corresponding control actions for each user input feature of the lighting control device 106.

At block 408, the Proprietary cloud 112 may transmit a message to each lighting device that is assigned to a user input feature of the lighting control device 106. The message may indicate that the lighting device is to be controlled by the lighting control device 106. For example, the Proprietary cloud 112 may transmit a message to both the lighting devices 102 and 104 indicating that each device has been assigned to be controlled by the lighting control device 106. The message may specify a unique identifier or address for the lighting control device 106 or may not specify which controller will control the first and second lighting devices 102 and 104. In one embodiment, the message may specify the number of lighting control devices that will control a specific lighting device. In one embodiment, the message may include a command instructing a lighting device to enable receipt of multicast communications, thereby allowing the lighting device to receive command messages or other communications broadcast to sets of lighting devices from a lighting control device. The message may also specify a multicast group to join by providing identification information for the multicast group.

At block 410, the Proprietary cloud 112 may transmit the residence key to any component of the operating environment 100. For example, once a component is operating within the operating environment—such as, for example, the first lighting device 102—the Proprietary cloud 112 may transmit the residence key to the first lighting device 102 once it is connected to the network 110.

Figure 5:
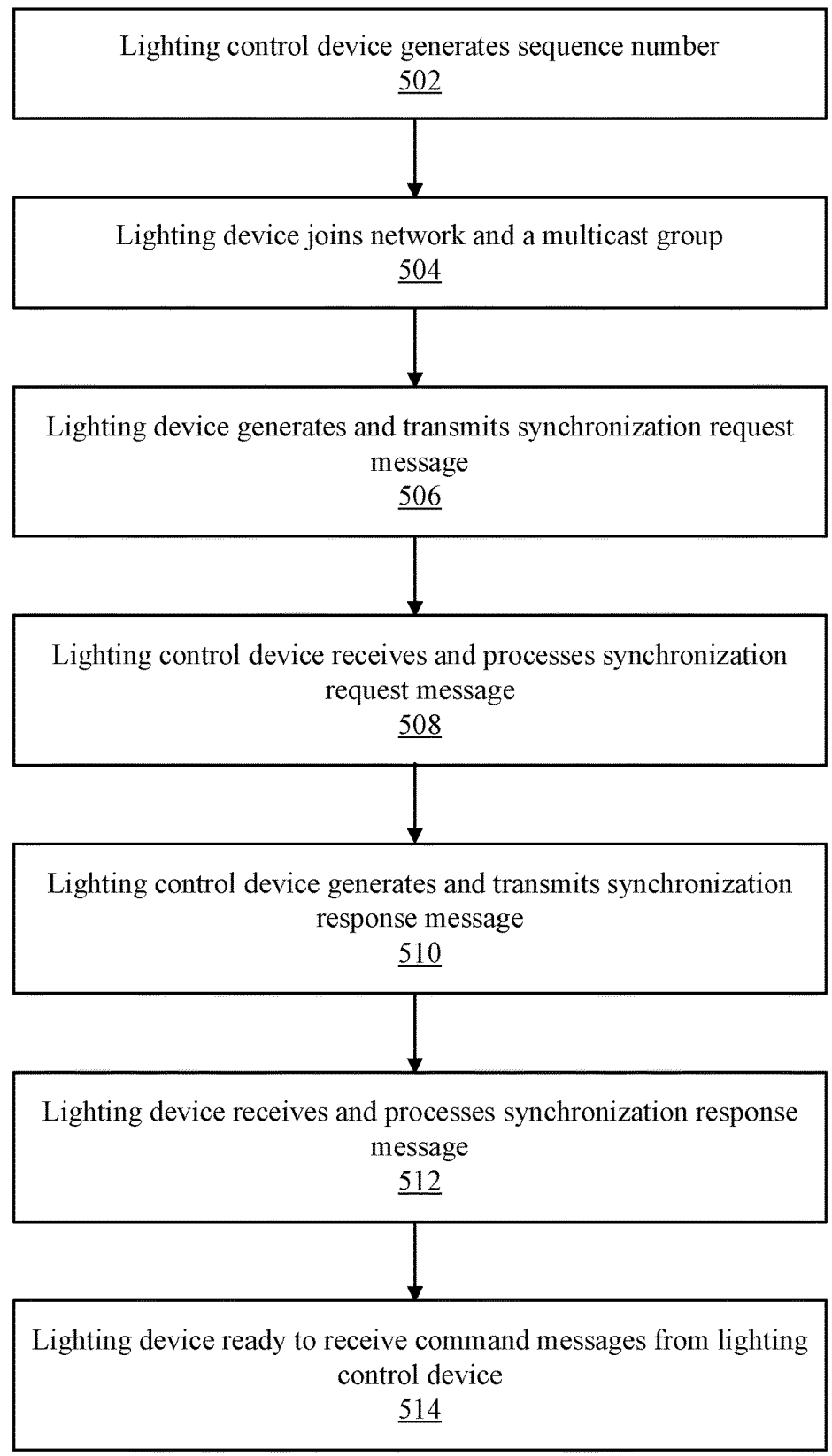
FIG. 5 illustrates a second logic flow associated with the lighting control device and the lighting devices of FIG. 1 according to another example embodiment.

FIG. 5 illustrates an example embodiment of a logic flow 500 that may be representative of techniques for synchronizing components of an operating environment to facilitate secure transmission of, for example, lighting scenes over a network. For example, the logic flow 500 may be representative of operations that may be performed by the lighting control device 106 and the first lighting device 102 of the operating environment 100 depicted in FIG. 1.

At block 502, the lighting control device 106 may generate an initial sequence number. The initial sequence number may be a random number. The initial sequence number may be stored locally by the lighting control device in, for example, non-volatile memory. The initial sequence number may also be stored remotely by the Proprietary cloud 112. The lighting control device 106 may generate the initial sequence number after enrollment with the Proprietary cloud 112.

At block 504, the lighting device 102 may join the network 110 and join a multicast group. The lighting device may join a specific multicast group based on information provided by the Proprietary cloud 112. The multicast group may include lighting devices that are to be controlled by the lighting control device 106. For example, the lighting device 102 may join a first multicast group that includes the lighting control device 106, the lighting device 102, and the lighting device 104. A message sent by any member of the first multicast group may be received and processed by every other member of the first multicast group, thereby providing an efficient manner for communicating with all members of a specific group of components of the operating environment 100.

At block 506, the lighting device 102 generates the synchronization request message. The synchronization request message may include the challenge number generated by the lighting device 102. The synchronization request message may be encrypted and transmitted to the first multicast group. The synchronization request message may be encrypted using the residence key of the operating environment. Accordingly, the synchronization request message may be received by the lighting control device 106 and the second lighting device 104.

At block 508, the lighting control device 106 may receive and process the synchronization request message. The lighting control device 106 may first decrypt the synchronization request message. The lighting control device may then determine that the decrypted message is a synchronization request message transmitted by the first lighting device 102. The lighting control device 106 may then determine the sequence number included in the synchronization request message.

At block 510, the lighting control device 106 may generate and transmit a synchronization response message. The synchronization response message may include the challenge number provided by the lighting device 102 and the initial sequence number generated by the lighting control device 106. The synchronization response message may be transmitted as a direct message to the first lighting device 102. For example, the synchronization response message may be intended to be processed by the first lighting device 102 only.

At block 512, the lighting device 102 may receive and process the synchronization response message. Specifically, the lighting device 102 may extract the challenge number included in the synchronization response message and compare it to the challenge number provided within the synchronization request message. If the two values match (e.g., if the challenge numbers have the same value), then the lighting device 102 may determine that the synchronization response message originated from the lighting control device 106 that is an authorized or otherwise verified controller within the operating network 100. The lighting device 102 may then store the unique identifier or address of the lighting control device 106 along with the corresponding initial sequence number of the lighting control device 106 provided in the synchronization response message and extracted by the first lighting device 102.

At block 514, the lighting device 102 is ready to receive command messages from the lighting control device 106. The lighting device 102 may also generate and transmit additional synchronization request messages to discover other lighting control devices that may be operating within the operating environment 100. The lighting device 102 may transmit the synchronization request messages over the same multicast group or another multicast group of which the lighting device 102 may be a member. In this way, the lighting device 102 may discover and identify all lighting control devices that are assigned to control the lighting device 102. Further, the lighting device 102 may verify each of the lighting control devices and receive their initial sequence numbers to facilitate future receipt and processing of command messages from any of the lighting control devices.

In one embodiment, the Proprietary cloud 112 may transmit to each lighting device—such as, for example, the lighting device 102—a message that includes each lighting control device assigned to control the lighting device. The message may include the initial sequence number for each lighting control device as well as the unique identifier or address for each lighting control device.

Figure 6:
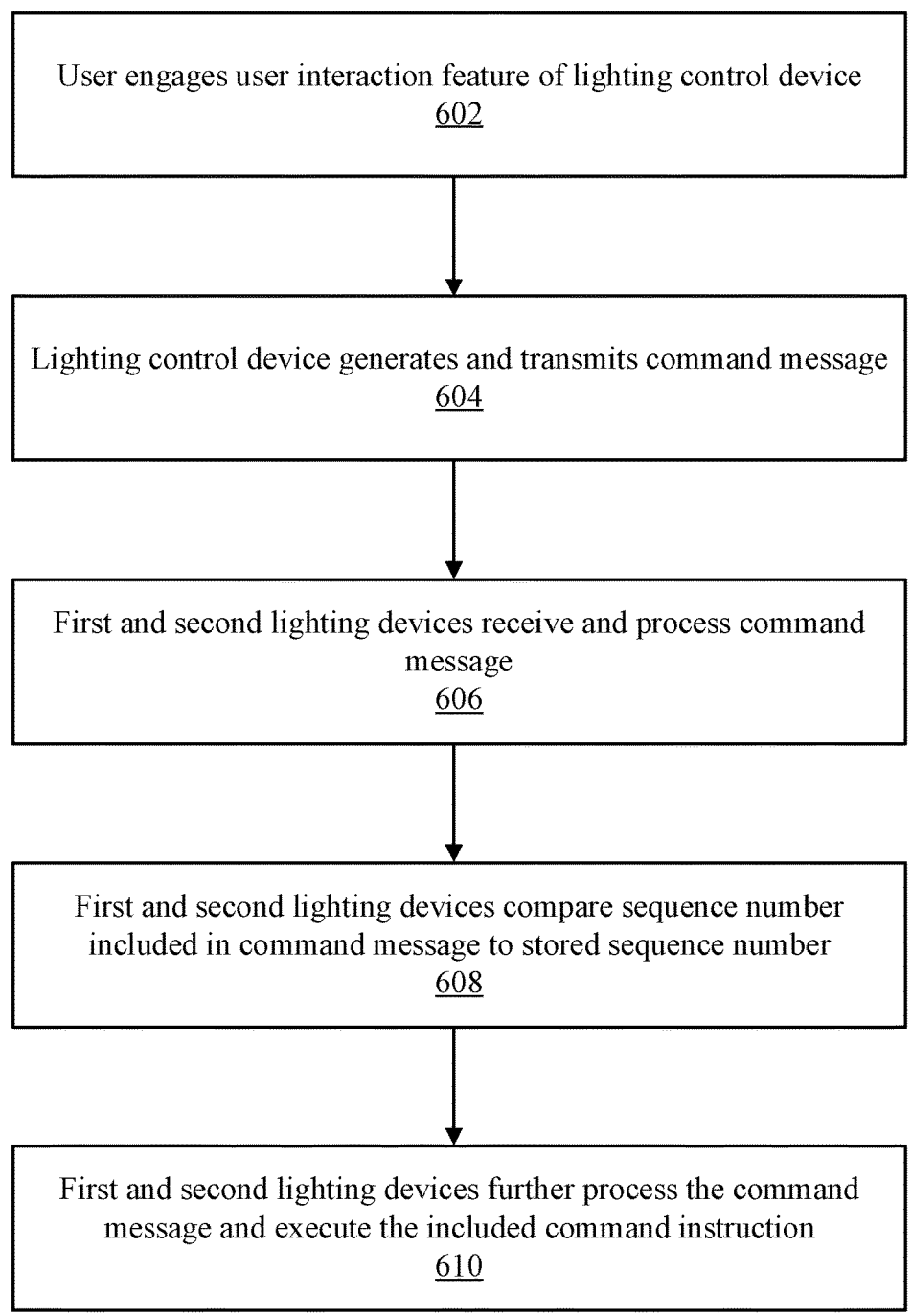
FIG. 6 illustrates a third logic flow associated with the lighting control device and the lighting devices of FIG. 1 according to another example embodiment.

FIG. 6 illustrates an example embodiment of a logic flow 600 that may be representative of techniques for securely transmitting, for example, lighting scenes over a network. For example, the logic flow 600 may be representative of operations that may be performed by one or more constituent components of the operating environment 100 depicted in FIG. 1.

At block 602, a user of the lighting control device 106 activates a first user interaction feature of the lighting control device 106. The first user interaction feature of the lighting control device 106 may be a push button on a keypad. By activating the first user interaction feature of the lighting control device 106, the user may intend a first lighting scene to be provided by the first and second lighting devices 102 and 104. The first lighting scene provided by the first and second lighting devices 102 and 104 may correspond to the first and second lighting devices 102 and 104 being turned ON to a full brightness setting.

At block 604, in response to the user activating the first user interaction feature of the lighting control device 106, the lighting control device 106 may generate and transmit a command message. The generated command message may include information indicating a scope of the message, a message type, one or more unique identifiers or addresses for the intended recipients of the message, an incremented sequence number, and a command instruction. The scope of the message may indicate if the message is intended to be processed by all components within the operating network (e.g., a global message), processed by a subset of components within the operating network (e.g., a group message), or processed by a single specific component within the operating network (e.g., a direct message). In one embodiment, the scope of the command message may have a group message scope.

The message type may be a controller announcement message, a synchronization request message, a synchronization response message, or a command message. In one embodiment, as described herein in relation to FIG. 6, the message type may be a command message.

The included unique identifiers or addresses for the intended recipients may include the unique identifiers or addresses assigned to both the first and second lighting devices 102 and 104. The unique identifiers or addresses included in the message may specify which components of the operating network 100 should process and execute the command instruction included in the message.

The included sequence number may be an incremented version of the last sequence number transmitted by the lighting control device 106. Each command message transmitted by the lighting control device 106 may contain a sequence number having a value that is greater than a value of the previous sequence number transmitted by the lighting control device 106.

The command instruction included in the command message may specify an operation to be implemented by the first and second lighting devices 102 and 104. The command instruction may correspond to the lighting action assigned to the first user interaction feature of the lighting control device 106 activated by the user. For example, the command instructions may instruct the first and second lighting devices 102 and 104 to turn ON to a maximum brightness setting.

The command message may be encrypted prior to transmission over the network 100. The command message may also include the unique identifier or address for the lighting control device 106 as the sender of the command message.

At block 606, the first and second lighting devices 102 and 104 may receive and process the command message. Other components within the operating environment 100 may also receive the command message but may ignore it after determining the command message is intended for the first and second lighting devices 102 and 104 only. Other components within the operating environment 100 may determine the command message is intended for the first and second lighting devices 102 and 104 by extracting the unique identifiers or addresses for intended recipients included in the command message. For example, a component may determine that its unique identifier is not included in the address field and so may determine it is not intended by the lighting control device 106 to execute the command instruction included in the command message.

At block 608, the first and second lighting devices 102 and 104 may determine the value of the sequence number included in the command message. The first and second lighting devices 102 and 104 may also determine the unique identifier for the lighting control device 106 included in the command message. Based on the determined unique identifier of the lighting control device 106, the first and second lighting devices 102 and 104 may look up the stored sequence number for the lighting control device 106. Each of the first and second lighting devices 102 and 104 may maintain a table stored in a memory storage device that includes a current sequence number for a corresponding lighting control device, including the lighting control device 106. The current sequence number for the lighting control device 106 stored by the first lighting device 102 may be the same or may be different from the current sequence number for the lighting control device 106 stored by the first lighting device 104.

Once the current sequence number is determined, the first and second lighting devices 102 and 104 may compare the received sequence number to the determined current sequence number. If the received sequence number has a value that is greater than a value of the current sequence number, then the first and second lighting devices 102 and 104 may then determine to further process the command message. If the received sequence number has a value that is equal to or less than the value of the current sequence number, then the first and second lighting devices 102 and 104 may then determine to ignore the command message and to not further process the command message.

At block 610, if the first and second lighting devices 102 and 104 both determine to further process the command message, then the first and second lighting devices 102 and 104 may determine and execute the command instruction included in the command message. For example, the first and second lighting devices 102 and 104 may determine to turn ON to a full brightness level, in accordance with the command instruction and the desired lighting scene initiated by the user.

FIG. 7 illustrates one embodiment of a synchronization request message 700. The synchronization request message 700 may be generated and transmitted by the lighting device 102 or the lighting device 104. For example, the synchronization request message 700 may be generated and transmitted by the lighting device 102 and received and processed by the lighting control device 106 as part of the logic flow 500. FIG. 7 illustrates example portions or fields of the synchronization request message 700.

As shown in FIG. 7, the synchronization request message 700 may include a message scope field 702, a message type field 704, a sender field 706, a recipient field 708, and a challenge number field 710. The synchronization request message 700 may include other fields or payloads not depicted in FIG. 7. The message scope field 702 may indicate the intended audience for processing the synchronization request message 700. In general, the message scope field 702 may indicate the synchronization request message 700 is a direct message (intended to be received by a single recipient), a group message (intended to be received by a group of recipients), or a global message (intended to be received by all recipients). In one embodiment, the message scope field 702 may indicate that the message is a group message, intended to be received by all members of a particular multicast group.

The message type field 704 may indicate that the synchronization request message 700 is a synchronization request message. The sender field 706 may indicate the unique identifier or address of the lighting device 102. The recipient field 708 may include the unique identifier or address of one or more devices intended to receive and process the synchronization request message 700. In one embodiment, the lighting device 102 may not know the unique address of one or more intended recipients and may not include the recipient field 708. In another embodiment, a message having a message scope 702 that is global may not include the recipient field 708 as all members of the operating environment 100 are intended to receive and process the message. In a further embodiment, a message having a message scope 702 that is a group may indicate a multicast group within the recipient field 708 as a more efficient manner to indicate intended receipt by all members of the specified group as opposed to listing the unique addresses of all members of the designated group.

The challenge number field 710 may include the randomly generated challenge number of the lighting device 102. The synchronization request message 700 may be generated by the processor 310 based on data or other information stored by the memory component 312. The format of the synchronization request message 700 may be known by the lighting control device 106 such that the processor 210 may determine the different fields included in the synchronization request message 700 so as to store any data or information provided therein.

FIG. 8 illustrates one embodiment of a synchronization response message 800. The synchronization response message 800 may be generated and transmitted by the lighting control device 106 in response to receiving a synchronization request message such as, for example, the synchronization request message 700. As a further example, the synchronization response message 800 may be generated and transmitted by the lighting control device 106 and received and processed by the lighting device 102 as part of the logic flow 500. FIG. 8 illustrates example portions or fields of the synchronization response message 800.

As shown in FIG. 8, the synchronization response message 800 may include the message scope field 702, the message type field 704, the sender field 706, the recipient field 708, a sequence number field 802, and the challenge number field 710. The synchronization response message 800 may include other fields or payloads not depicted in FIG. 8. In one embodiment, the message scope field 702 may indicate that the message is a direct message, as the synchronization response message 800 is intended for only one recipient—that is, the lighting device 102.

The message type field 704 may indicate that the synchronization response message 800 is a synchronization response message. The sender field 706 may indicate the unique identifier or address of the lighting control device 106. The recipient field 708 may indicate the unique identifier or address of the lighting device 104.

The sequence number field 802 may indicate the initial sequence number of the lighting control device 106. The challenge number field 710 may indicate the challenge number received by the lighting control device 106 from the lighting device 102—for example, as part of the synchronization request message 800.

The format of the synchronization response message 800 may be known by the lighting device 102 such that the processor 310 may determine the different fields included in the synchronization response message 800 so as to store any data or information provided therein. In one embodiment, the processor 310 may determine the challenge number included in the challenge number field 710 and may compare it to a challenge number stored in the memory component 310. If the two challenge numbers match, then the processor 310 may extract the sequence number from the sequence number field 802 for storage in the memory component 312.

FIG. 9 illustrates one embodiment of a command message 900. The command message 900 may be generated and transmitted by the lighting control device 106. For example, the command message 900 may be generated and transmitted by the lighting control device 106 and received and processed by the lighting devices 102 and 104 as part of the logic flow 600. The command message 900 may be generated in response to a user activating a user interaction feature of the lighting device 106—for example, a first user interaction feature configured to instruct the first and second lighting devices 102 and 104 to be turned ON. FIG. 9 illustrates example portions or fields of the command message 700.

As shown in FIG. 9, the command message 900 may include the message scope field 702, a message type field 902, a sender field 706, a recipient field 904, a sequence number field 906, and a command instruction field 908. The command message 900 may include other fields or payloads not depicted in FIG. 9. In one embodiment, the message scope field 702 may indicate that the message is a group message, intended to be received by all members of a particular multicast group—for example, a group including the first and second lighting devices 102 and 104.

The message type field 902 may indicate that the message includes an instruction or is a controller announcement. A controller announcement may not include an instruction. A controller announcement may include data or other information for the intended recipients. In one embodiment, the message type field may indicate that the command message 900 is a command message.

The sender field 706 may indicate the unique identifier or address of the lighting control device 106. In one embodiment, the sender field 706 may not be included as part of the command message 900. The recipient field 904 may indicate the unique identifier or address for each of the lighting devices 102 and 104. Alternatively, the recipient field 904 may indicate a group identifier or a multicast group identifier that corresponds to a known list of devices.

The sequence number field 906 may indicate an incremented sequence number of the lighting control device 106. The command instruction field 908 may indicate a lighting instruction. The lighting instruction may adjust an operation or operational state of the lighting loads of the first and second lighting devices 102 and 104. Any type of lighting instruction may be provided including, for example, turning ON or OFF or dimming UP or DOWN. The lighting instruction can correspond to the lighting action assigned to the user interaction feature of the lighting control device 106 activated by the user.

The format of the command message 900 may be known by the lighting device 102 such that the processor 310 may determine the different fields included in the command message 900 so as to store any data or information provided therein. In one embodiment, the processor 310 may extract the incremented sequence number from the sequence number field 906 to determine if it is larger than a sequence number stored in the memory component 312. If so, then the processor 310 may determine to further extract and implement the instruction provided in the command instruction field 908. If not, then the processor 310 may determine to ignore the command message 900. The lighting device 104 may similarly process the command message 900.

Figure 10:
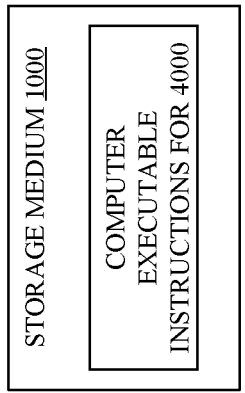
FIGS. 10-11 illustrates embodiments of a storage medium and a computing platform of embodiments described herein.

FIG. 10 illustrates an example of a storage medium 1000 to store processor data structures. Storage medium 1000 may comprise an article of manufacture. In some examples, storage medium 1000 may include any non-transitory computer readable medium or machine-readable medium, such as an optical, magnetic or semiconductor storage. Storage medium 1000 may store diverse types of computer executable instructions, such as instructions to implement logic flows and/or techniques described herein including instructions for computing platform 1100 in FIG. 11. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 11:
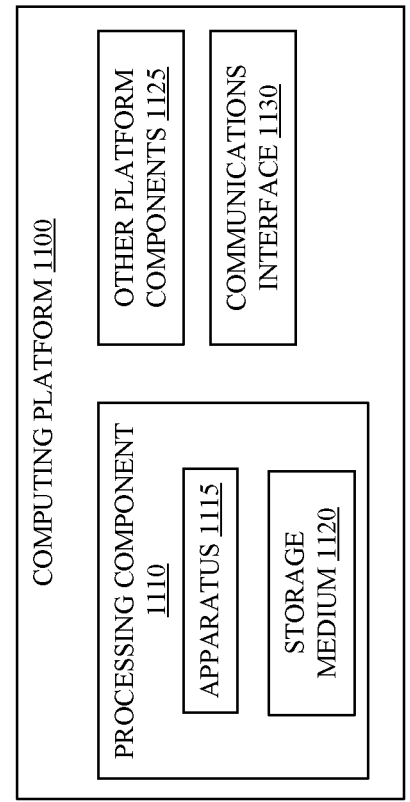

FIG. 11 illustrates an example computing platform 1100 such as the controller/lighting control device 106, the user device 108, and proprietary cloud service/platform 112, the device 1, and the device 2 discussed in conjunction with FIGS. 1-9. In some examples, as shown in FIG. 11, computing platform 1100 may include a processing component 1110, other platform components, and a communications interface 1130. According to some examples, computing platform 1100 may be a computing device such as a lighting control device, a smart phone, a laptop, a lighting device or a manager or controller for managing configurable computing resources as mentioned above. Furthermore, the communications interface 1130 may comprise a wake-up radio (WUR) and may be capable of waking up a main radio of the computing platform 1100.

According to some examples, processing component 1110 may execute processing operations or logic for apparatus 1115 described herein. Processing component 1110 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 1120, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 1125 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1130 may include logic and/or features to support a communication interface. For these examples, communications interface 1130 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 1100 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 1100 may include or exclude functions and/or specific configurations of the computing platform 1100 described herein.

The components and features of computing platform 1100 may comprise any combination of discrete circuitry, ASICs, logic gates and/or single chip architectures. Further, the features of computing platform 1100 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

We claim:

1. A lighting control device, comprising:
a user interaction component;
a memory;
logic, at least a portion of the logic implemented in circuitry coupled to the memory and the user interaction component, the logic to:
process a setup message assigning a first lighting device and a second lighting device and a corresponding lighting action to the user interaction component;
receive an input from a user through the user interaction component;
retrieve a first sequence number stored in the memory;
increment the first sequence number to generate an incremented sequence number;
generate a command message in response to the received input from the user,
the command message to include a command instruction corresponding to the lighting action, the command message to further include the incremented sequence number; and
cause transmission of the command message to the first and second lighting devices over a wireless local area network (LAN).

2. The lighting control device of claim 1, the setup message received from a remote cloud service.

3. The lighting control device of claim 1, the user interaction component to comprise a push button of a keypad and the input received from the user to comprise the user pressing the push button.

4. The lighting control device of claim 1, the first sequence number to comprise a randomly generated integer; the logic to increment the first sequence number by a fixed amount to generate the incremented sequence number or to increment the first sequence number by a random amount to generate the incremented sequence number.

5. The lighting control device of claim 1, the logic to encrypt the command message prior to causing transmission of the command message to the first and second lighting devices over the wireless LAN; the logic to encrypt the command message based on an Advanced Encryption Standard (AES) key; the logic to store the AES key received from a remote cloud service.

6. The lighting control device of claim 1, the logic further to:
receive a synchronization request message, the synchronization request message to include a first challenge number;
process the synchronization request message to determine that the synchronization request message is associated with the first lighting device and to determine the first challenge number;
generate the first sequence number;
store the first sequence number in the memory;
generate a synchronization response message, the synchronization response message comprising the first sequence number and the first challenge number; and
cause transmission of the synchronization response message to the first lighting device.

7. The lighting control device of claim 6, the first challenge number to comprise a randomly generated integer.

8. The lighting control device of claim 6, wherein one or more of the command message and the synchronization request message comprise a multicast message to a multicast group.

9. The lighting control device of claim 6, the synchronization response message to further comprise a unique identifier for the lighting control device.

10. The lighting control device of claim 6, the synchronization request message encrypted based on an Advanced Encryption Standard (AES) key.

11. The lighting control device of claim 10, the logic to decrypt the synchronization request message prior to determining the first challenge number based on the AES key.

12. A method, comprising:
processing a setup message assigning a first lighting device and a second lighting device and a corresponding lighting action to a user interaction component;
receiving an input from a user through the user interaction component;
retrieving a sequence number stored in a memory;
incrementing the sequence number to generate an incremented sequence number;
generating a command message in response to the received input from the user, the command message to include a command instruction corresponding to the lighting action, the command message to further include the incremented sequence number; and
cause transmission of the command message to the first and second lighting devices over a wireless local area network (LAN).

13. The method of claim 12, further comprising generating the sequence number and storing the sequence number in the memory, wherein the sequence number comprises a randomly generated integer.

14. The method of claim 13, further comprising incrementing the sequence number by a fixed amount to generate the incremented sequence number or incrementing the sequence by a random amount to generate the incremented sequence number.

15. The method of claim 12, further comprising encrypting the command message prior to causing transmission of the command message to the first and second lighting devices over the wireless LAN, wherein the encrypting comprises encrypting the command message based on an Advanced Encryption Standard (AES) key; and further comprising storing the AES key received from a remote cloud service.

16. The method of claim 12, further comprising:
receiving a synchronization request message, the synchronization request message to include a first challenge number;
processing the synchronization request message to determine that the synchronization request message is associated with the first lighting device and to determine the first challenge number;
generating a first sequence number;
storing the first sequence number in the memory;
generating a synchronization response message, the synchronization response message comprising the first sequence number and the first challenge number; and
causing transmission of the synchronization response message to the first lighting device.

17. The method of claim 16, the synchronization request message as a multicast message to a multicast group.

18. The method of claim 16, the synchronization response message to further comprise a unique identifier for a lighting control device, the synchronization request message encrypted based on an Advanced Encryption Standard (AES) key.

19. A system, comprising:
a memory;
logic, at least a portion of the logic implemented in circuitry coupled to the memory, the logic to:
synchronize a lighting device with a lighting control device, the synchronization based on communication of a first challenge number, a second challenge number, and a first sequence number between the lighting device and the lighting control device, the synchronization to prepare the lighting device to receive command messages from the lighting control device; and
control a lighting load of the lighting device based on user input, the user input received via user interaction with a user interaction component;
the control performed via communication of a command instruction in a command message, the command instruction based on the user input, the command message comprising the command instruction and a second sequence number, the second sequence number being greater than the first sequence number;
the communication between the lighting control device and the lighting device over a wireless local area network (LAN).

20. The system of claim 19, further comprising the user interaction component, the user interaction component coupled with the logic to generate the command message with the command instruction and to increment the first sequence number to generate the second sequence number.

21. The system of claim 20, the logic to further receive a setup message from a remote cloud service.

22. The system of claim 20, the logic to increment the first sequence number by a random amount to generate the second sequence number.

23. The system of claim 19, further comprising the lighting load, the lighting load coupled with the logic to compare the first sequence number with the second sequence number and to perform the command instruction from the command message after a determination that the first sequence number is greater than the second sequence number.

24. The system of claim 19, the first challenge number to comprise a randomly generated integer and the first sequence number to comprise a randomly generated integer.

25. The system of claim 19, the logic to join a multicast group prior to causing transmission of a synchronization request message to start the synchronization of the lighting device and the lighting control device; receive an indicator of the multicast group from a remote cloud service; and cause transmission of the synchronization request message as a multicast message to the multicast group.

* * * * *